United States Patent
Tenny et al.

(10) Patent No.: US 8,630,259 B2
(45) Date of Patent: Jan. 14, 2014

(54) PDCP BEHAVIOUR AT HANDOVER AND CONNECTION RE-ESTABLISHMENT

(75) Inventors: Nathan Edward Tenny, Poway, CA (US); Peter A. Barany, San Diego, CA (US); Arnaud Meylan, Bois-Colombes (FR)

(73) Assignee: QUALCOMM Incorporated, San Diego, CA (US)

( * ) Notice: Subject to any disclaimer, the term of this patent is extended or adjusted under 35 U.S.C. 154(b) by 1222 days.

(21) Appl. No.: 12/500,532

(22) Filed: Jul. 9, 2009

(65) Prior Publication Data

US 2010/0029280 A1 Feb. 4, 2010

Related U.S. Application Data

(60) Provisional application No. 61/086,102, filed on Aug. 4, 2008.

(51) Int. Cl.
*H04W 4/00* (2009.01)

(52) U.S. Cl.
USPC .......................................................... 370/331

(58) Field of Classification Search
USPC .................................. 370/331, 464; 455/436
See application file for complete search history.

(56) References Cited

U.S. PATENT DOCUMENTS

| | | | |
|---|---|---|---|
| 2006/0187955 A1* | 8/2006 | Rezaiifar et al. | 370/464 |
| 2008/0188224 A1* | 8/2008 | Pani et al. | 455/436 |
| 2009/0016301 A1* | 1/2009 | Sammour et al. | 370/331 |
| 2009/0185535 A1* | 7/2009 | Lee et al. | 370/331 |

FOREIGN PATENT DOCUMENTS

WO WO2009009532 A2 1/2009

OTHER PUBLICATIONS

"PDCP Behaviour at RRC Connection Re-establishment and Handover", 3GPP TSG-RAN WG2 #63, R2-083865, Source: Qualcomm Europe, Aug. 25-29, 2008, Jeju Island, Korea.
3GPP TS 36.323 V8.2.1 3rd Generation Partnership Project:Technical Specification Group Radio Access Network;Evolved Universal Terrestial Radio Access (E-UTRA);Pocket Data convergence protocol (PDCP)Specification (Release 8),May 2008.
ASUSTEK: "PDCP handling at RRC connection re-establishment" 3GPP Draft; R2-084041 PDCP Handling at RRC Connection Re-Establishment, 3rd Generation Partnership Project (3GPP), Mobile Competence Centre ; 650, Route Des Lucioles ; F-06921 Sophia-Antipolis Cedex France, No. Jeju; 20080812, Aug. 12, 2008, XP050319201 [ retrieved on Aug. 12, 2008] the whole document.
International Search Report and Written Opinion—PCT/US2009/052607—ISA/EPO—Dec. 3, 2009.

* cited by examiner

*Primary Examiner* — Mark Rinehart
*Assistant Examiner* — Gbemileke Onamuti

(57) ABSTRACT

Systems and methodologies are described that facilitate configuring a flush timer within a wireless environment in order to provide robust communications in regards to handover or re-establishment. The flush timer can be triggered upon successful completion of reconfiguration re-establishment. Moreover, the flush timer can be triggered upon successful completion of handover. In the case of handover and re-establishment, a separate indication of handover to packet data convergence protocol (PDCP) from the start of PDCP flush timer can be utilized.

80 Claims, 10 Drawing Sheets

PDCP BEHAVIOUR AT HANDOVER AND CONNECTION RE-ESTABLISHMENT

CROSS-REFERENCE TO RELATED APPLICATIONS

This application claims the benefit of U.S. Provisional Patent application Ser. No. 61/086,102 entitled "PDCP BEHAVIOUR AT HANDOVER AND CONNECTION RE-ESTABLISHMENT" which was filed Aug. 4, 2008. The entirety of the aforementioned application is herein incorporated by reference.

BACKGROUND

I. Field

The following description relates generally to wireless communications, and more particularly to packet data convergence protocol (PDCP) control protocol data behavior during handover and/or connection re-establishment.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

A layer two protocol stack (e.g., also referred to as a user-plane protocol stack) can include a packet data convergence protocol (PDCP) layer, a radio link control (RLC) layer, and a medium access control (MAC) layer. The packet data convergence protocol (PDCP) can perform services such as security, header compression, ciphering, and handoff. Security services can include ciphering to prevent others (e.g., attackers) from reading the transmitted messages and integrity protection, which prevents others from forging the identity of a user. Header compression services can compress headers of certain types of packets (e.g., IP headers, UDP headers, and RTP headers). Hand off services can include in-order delivery and selective delivery services that may include re-transmission services. The radio link control (RLC) layer can perform services, such as segmentation, concatenation, re-assembly, re-transmission, and other services that ensure that the radio link is reliable. The medium access control (MAC) layer can perform service, such as scheduling, building frames that are physically transported in the physical layer (PHY), and acknowledgement (ACK) and negative acknowledgement (NACK) services, such as hybrid ARQ (HARQ).

As a result of handover and connection re-establishment, the RLC can be reset. In order to provide lossless ordered data delivery, the PDCP utilizes a handover mode in which PDCP protocol data units (PDUs) are re-ordered and re-transmitted. A duration of time to which such re-ordering and re-transmitting occurs is dictated by a flush timer. The flush timer can ensure the delivery of data should a missing PDCP PDU is not received. Moreover, traditional techniques involve starting the flush timer when a handover command is received and a user equipment (UE) initiates re-establishment. Yet, such flush timer initiation is much earlier than when data radio bearers operation resumes which can substantially determine handover performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates initiating a flush timer with an accurate representation of a handover technique or a reconfiguration after re-establishment within a wireless network. The method can include detecting a handover request between a user equipment and a serving base station and a target base station based upon at least one of a reception of mobility control command or an initiation of re-establishment. Moreover, the method can comprise operating a packet data convergence protocol (PDCP) in a handover mode based upon the initiation of at least one of a handover or a radio resource control (RRC) communication re-establishment. Furthermore, the method can include starting a flush timer upon a completion of the handover between the user equipment to the target base station. The method can include starting a flush timer upon a completion of reconfiguration of RRC communication re-establishment. The method can additionally include transmitting a portion of data related to the flush timer. The method can include reverting to a regular PDCP operation when the flush timer expires.

Another aspect relates to a wireless communications apparatus. The wireless communications apparatus can include at least one processor configured to detect a handover request between a user equipment and a serving base station and a target base station based upon at least one of a reception of mobility control command or an initiation of re-establishment, operate a packet data convergence protocol (PDCP) in a handover mode based upon the initiation of at least one of a handover or a radio resource control (RRC) communication re-establishment, start a flush timer upon a completion of the handover between the user equipment to the target base station, start a flush timer upon a completion of reconfiguration of RRC communication re-establishment, transmit a portion of data related to the flush timer, and reverting to a regular PDCP operation when the flush timer expires. The wireless communications apparatus can include memory coupled to the at least one processor.

Yet another aspect relates to a wireless communications apparatus that enables configuring a flush timer in relation to a handover initiation or a radio resource control (RRC) communication re-establishment. The wireless communications apparatus can include means for detecting a handover request between a user equipment and a serving base station and a target base station based upon at least one of a reception of mobility control command or an initiation of re-establishment. Additionally, the wireless communications apparatus can include means for operating a packet data convergence protocol (PDCP) in a handover mode based upon the initiation of at least one of a handover or a radio resource control (RRC) communication re-establishment. The wireless communications apparatus can further include means for starting a flush timer upon a completion of the handover between the user equipment to the target base station. Moreover, the wireless communications apparatus can include means for starting a flush timer upon a completion of reconfiguration of RRC communication re-establishment. The wireless communications apparatus can further include means for transmitting a portion of data related to the flush timer. The wireless communications apparatus can further include means for reverting to a regular PDCP operation when the flush timer expires.

Still another aspect relates to a computer program product comprising a computer-readable medium having stored thereon code for code for causing at least one computer to detect a handover request between a user equipment and a serving base station and a target base station based upon at least one of a reception of mobility control command or an initiation of re-establishment, to operate a packet data convergence protocol (PDCP) in a handover mode based upon the initiation of at least one of a handover or a radio resource control (RRC) communication re-establishment, to start a flush timer upon a completion of the handover between the user equipment to the target base station, to start a flush timer upon a completion of reconfiguration of RRC communication re-establishment, to transmit a portion of data related to the flush timer, and to revert to a regular PDCP operation when the flush timer expires.

According to related aspects, a method that facilitates employing an optimized flush timer to ensure delivery of data within a wireless environment. The method can include receiving a portion of data related to a start of a flush timer, the start of the flush timer is triggered based upon at least one of the following: a completion of a handover between the user equipment to the target base station; or a completion of reconfiguration of RRC communication re-establishment. Moreover, the method can include utilizing the portion of data related to the start of the flush timer to provide an accurate estimate of an expiration of the flush timer. Furthermore, the method can include leveraging the portion of data related to the start of the flush timer to ensure delivery of a portion of data communicated before the expiration of the flush timer.

Another aspect relates to a wireless communications apparatus. The wireless communications apparatus can include at least one processor configured to receive a portion of data related to a start of a flush timer, the start of the flush timer is triggered based upon at least one of the following: a completion of a handover between the user equipment to the target base station; or completion of reconfiguration of RRC communication re-establishment, utilize the portion of data related to the start of the flush timer to provide an accurate estimate of an expiration of the flush timer, and leverage the portion of data related to the start of the flush timer to ensure delivery of a portion of data communicated before the expiration of the flush timer. The wireless communications apparatus can include memory coupled to the at least one processor.

Yet another aspect relates to a wireless communications apparatus that enables cross layer optimization of data. The wireless communications apparatus can include means for receiving a portion of data related to a start of a flush timer, the start of the flush timer is triggered based upon at least one of the following: a completion of a handover between the user equipment to the target base station; or a completion of reconfiguration of RRC communication re-establishment. Further, the wireless communications apparatus can comprise means for utilizing the portion of data related to the start of the flush timer to provide an accurate estimate of an expiration of the flush timer. The wireless communications apparatus can include means for leveraging the portion of data related to the start of the flush timer to ensure delivery of a portion of data communicated before the expiration of the flush timer.

Still another aspect relates to a computer program product comprising a computer-readable medium having stored thereon code for code for causing at least one computer to receive a portion of data related to a start of a flush timer, the start of the flush timer is triggered based upon at least one of the following: a completion of a handover between the user equipment to the target base station; or a completion of reconfiguration of RRC communication re-establishment, to utilize the portion of data related to the start of the flush timer to provide an accurate estimate of an expiration of the flush timer, and to leverage the portion of data related to the start of the flush timer to ensure delivery of a portion of data communicated before the expiration of the flush timer.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
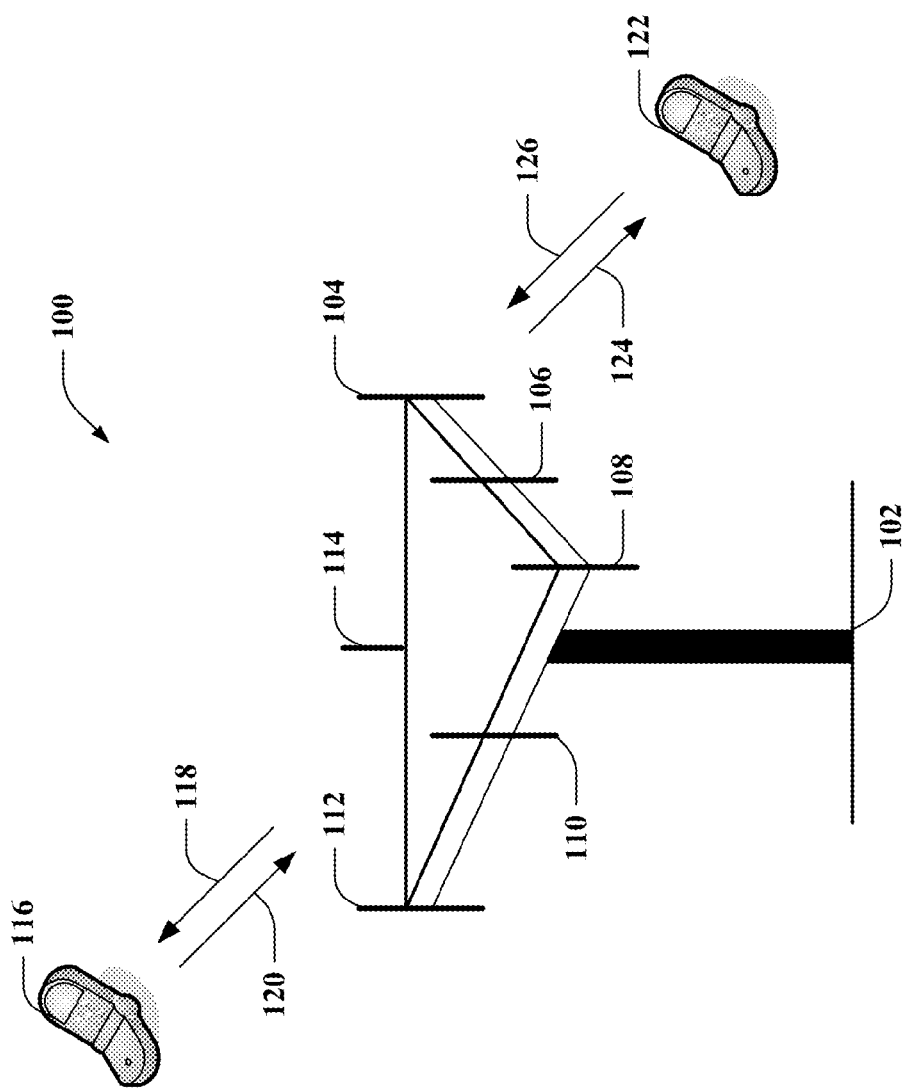
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "component," "flush timer," "evaluator," "protocol layer," "user-plane protocol stack," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

In general, the subject innovation can start or trigger a flush timer based upon a completion of 1) a handover between user equipment and a base station (e.g., also referred to as an eNode B); and/or 2) a reconfiguration after re-establishment. By starting and configuring the flush timer based upon such criteria, the handover delay can be minimized as well as providing a reduced risk of HFN de-synchronization at handover. In general, the subject innovation can provide a substantially more robust communication by triggering, or starting, the flush timer upon indication of successful handover. This can allow the target eNB to have an accurate estimate of when the flush timer will expire (e.g., in the UE) and dimension it appropriately. In addition, in view that the indication to PDCP that a handover occurs is still necessary before RLC is reset, the subject innovation also decouples the indication of handover from the start of the flush timer. Decoupling can fix the issue of the target eNode B not knowing when the flush timer ends. It should be appreciated that indication of handover and initiation of flush timer occurs within the UE that is handed off, thus any added complexity that may result from conveying two disparate indications, e.g., indication of handover to PDCP and indication to trigger flush timer, is not detrimental to communication since such indications are not transmitted over the air. It should be further appreciated that within the subject innovation, the flush timer need not be set up conservatively to avoid de-synchronization.

Figure 2:
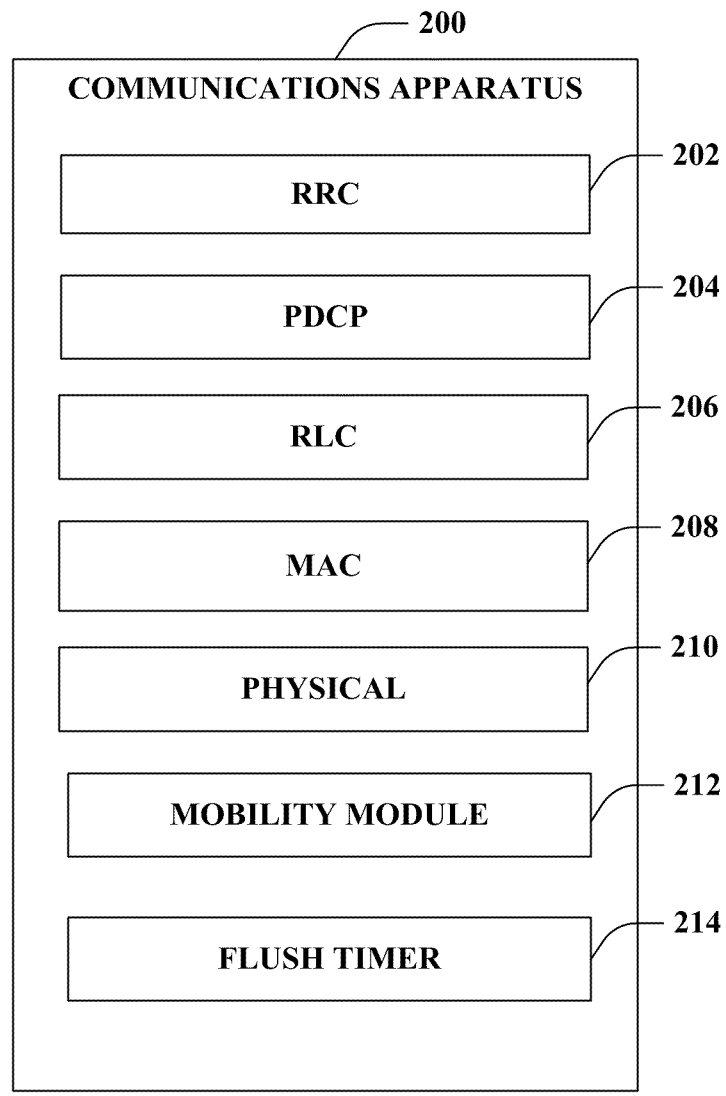
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to configure a flush timer in order to optimize handover.

The communications apparatus 200 can leverage a user-plane protocol stack (e.g., a layer two protocol stack) with a variety of protocol layers for communication. For instance, the user-plane protocol stack can include a radio resource control (RRC) protocol layer (herein referred to as "RRC 202"), a packet data convergence protocol (PDCP) layer (herein referred to as "PDCP 204"), a radio link control (RLC) protocol layer (herein referred to as "RLC 206"), a medium access control (MAC) protocol layer (herein referred to as "MAC 208"), and a physical protocol layer (herein referred to as "Physical 210"). It is to be appreciated that the communications apparatus 200 can include any number of protocol layers and the subject innovation is not limited to the protocol layers discussed above.

The communications apparatus 200 can further include a mobility module 212 that can facilitate handover procedure(s) with a target cell (not shown) and initiate RRC connection re-establishment in accordance with aspects described herein. In particular, the mobility module 212 can determine whether handover initiates in order to trigger a handover mode for the PDCP. Additionally, the mobility module 212 can indicate the PDCP to operate in a handover mode when RRC communication re-establishment initiates. The communication apparatus 200 can further include a flush timer 214. Based at least in part upon the mobility module 212, the flush timer can be triggered or started. In particular, the flush timer 214 can be configured to start based upon the completion of the handover between the user equipment to the target base station or the completion of reconfiguration of RRC communication re-establishment. It is to be appreciated that the completion of the handover or the reconfiguration can be error-free in order to trigger the flush timer.

Moreover, although not shown, it is to be appreciated that communications apparatus 200 can include memory that retains instructions with respect to detecting a handover request based upon a transition between a user equipment (UE) and a serving base station and a target base station, operating a packet data convergence protocol (PDCP) in a handover mode based upon the initiation of at least one of a handover or a radio resource control (RRC) communication re-establishment; initiating a flush timer upon a completion of the handover between the user equipment to the target base station, starting a flush timer upon a completion of reconfiguration of RRC communication re-establishment, transmitting a portion of data related to the flush timer, and the like.

Furthermore, it is to be appreciated that communications apparatus 200 can include memory that retains instructions with respect to receiving a portion of data related to a start of a flush timer, starting the flush timer based upon a completion of at least one of a handover between the UE to the target base station or reconfiguration of RRC communication re-establishment, utilizing the portion of data related to the start of the flush time to provide an accurate estimate of an expiration of the flush timer, leveraging the portion of data related to the start of the flush timer to ensure delivery of a portion of data communicated before the expiration of the flush timer, and the like. Further, communications apparatus 200 can include a processor that may be utilized in connection with executing instructions (e.g., instructions retained within memory, instructions obtained from a disparate source, . . . ).

Figure 3:
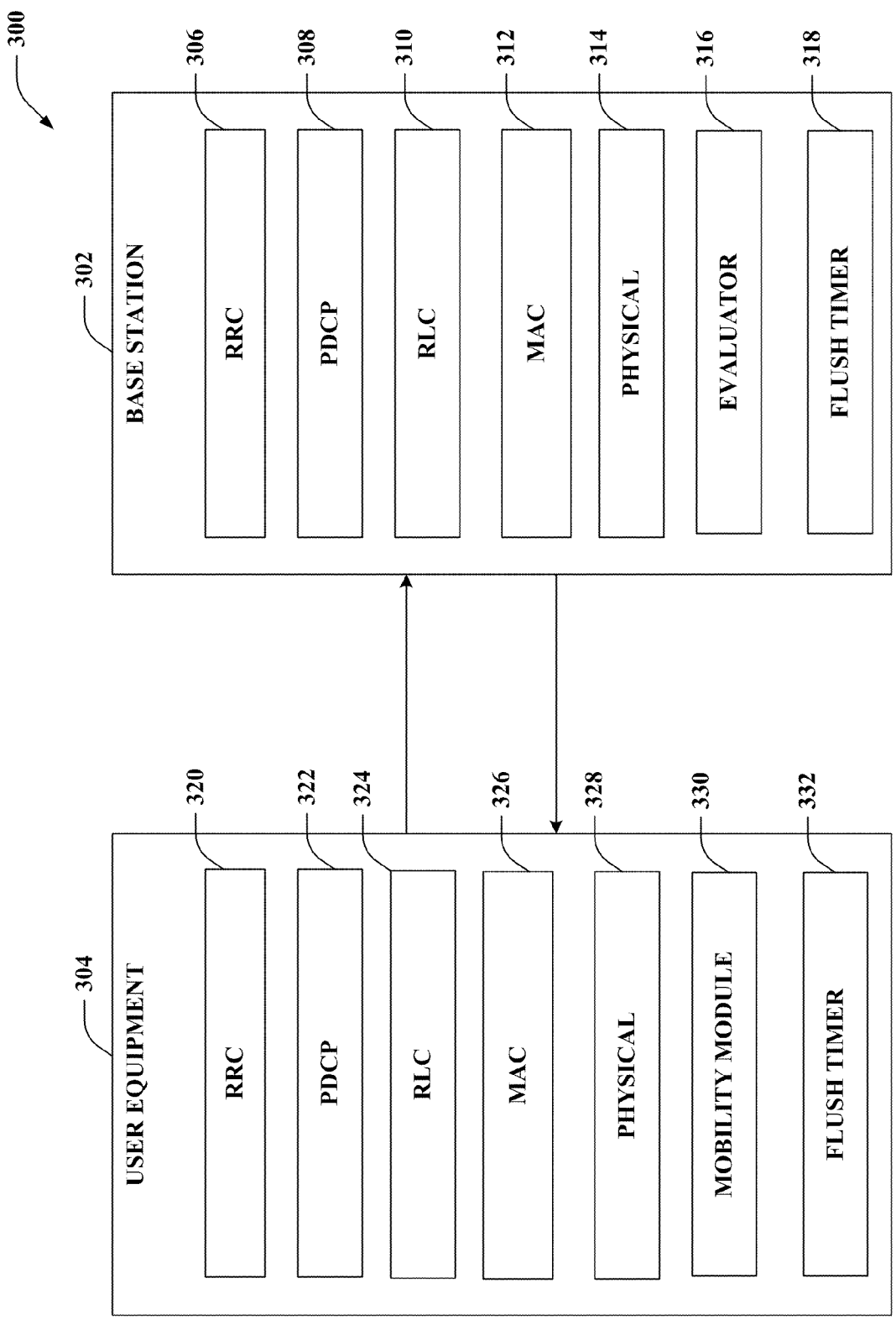
FIG. 3 is an illustration of an example wireless communications system that facilitates configuring a flush timer.

Now referring to FIG. 3, illustrated is a wireless communications system 300 that facilitates configuring a flush timer. The system 300 includes a base station 302 that communicates with a user equipment (UE) 304 (and/or any number of disparate communication apparatus (not shown)). Base station 302 can transmit information to user equipment (UE) 304 over a forward link channel; further base station 302 can receive information from user equipment (UE) 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment (UE) 304 as well and vice versa, in one example; the configuration depicted excludes these components for ease of explanation.

Base station 302 can include a protocol stack with a control-plane radio resource control (RRC) protocol layer (herein referred to as "RRC 306"), and user-plane protocols including a packet data convergence protocol (PDCP) layer (herein referred to as "PDCP 308"), a radio link control (RLC) protocol layer (herein referred to as "RLC 310"), a medium access control (MAC) protocol layer (herein referred to as "MAC 312"), and a physical protocol layer (herein referred to as "Physical 314"). It is to be appreciated that the base station 302 can include any suitable number of protocol layers and the subject innovation is not limited to the protocol layers described herein. The base station 302 can further include an evaluator that can analyze a portion of data related to a flush timer 318. The portion of data related to the flush timer can be, for instance, configuration data such as a start time or a triggering event that initiates the flush timer. The base station 302 can also include the flush timer 318. It is to be appreciated that the flush timer 318 can be incorporated with the base station 302, incorporated into the user equipment 304 (e.g., as depicted with the flush timer 332), or any suitable combination thereof.

User equipment 304 can include a control-plane protocol stack with a radio resource control (RRC) protocol layer (herein referred to as "RRC 320"), and user-plane protocols including a packet data convergence protocol (PDCP) layer (herein referred to as "PDCP 322"), a radio link control (RLC) protocol layer (herein referred to as "RLC 324"), a medium access control (MAC) protocol layer (herein referred to as "MAC 326"), and a physical protocol layer (herein referred to as "Physical 328"). It is to be appreciated that the user equipment 304 can include any suitable number of protocol layers and the subject innovation is not limited to the protocol layers described herein. The user equipment 304 can further include a mobility module 330 that can detect at least one of a handover process with the user equipment in a wireless environment or a reconfiguration re-establishment process. Based upon such detection, the flush timer (e.g., flush timer 332, flush timer 318, and the like) can be triggered. In particular, the mobility module 330 can implement a handover mode for PDCP 322 based upon the initiation of a handover or RRC communication re-establishment, wherein the flush timer can be initiated upon the completion of handover and/or the reconfiguration of RRC communication re-establishment.

Moreover, although not shown, it is to be appreciated that base station 302 can include memory that retains instructions with respect to detecting a handover request based upon a transition between a user equipment (UE) and a serving base station and a target base station, operating a packet data convergence protocol (PDCP) in a handover mode based upon the initiation of at least one of a handover or a radio resource control (RRC) communication re-establishment; initiating a flush timer upon a completion of the handover between the user equipment to the target base station, starting a flush timer upon a completion of reconfiguration of RRC communication re-establishment, transmitting a portion of data related to the flush timer, and the like. Furthermore, it is to be appreciated that base station 302 can include memory that retains instructions with respect to receiving a portion of data related to a start of a flush timer, starting the flush timer based upon a completion of at least one of a handover between the UE to the target base station or reconfiguration of RRC communication re-establishment, utilizing the portion of data related to the start of the flush time to provide an accurate estimate of an expiration of the flush timer, leveraging the portion of data related to the start of the flush timer to ensure delivery of a portion of data communicated before the expiration of the flush timer, and the like. Further, base station 302 can include a processor that may be utilized in connection with executing instructions (e.g., instructions retained within memory, instructions obtained from a disparate source, . . . ).

In packet-based advanced wireless telecommunication, during handover RLC passes RLC SDUs possibly with gaps to PDCP, which operates in "handover mode" to provide lossless data transfer, re-ordering, and duplicate elimination for a time span defined by a flush timer; when flush timer expires, PDCP handover expires. At least one objective of the flush timer is to ensure delivery of data not in sequence, should a missing PDCP PDU not be received. Various aspects of communication are sensitive to the flush timer and its utilization as an indicator to stop PDCP handover mode, which substantially determines handover performance.

As an example, if a gap in the sequence of received PDCP SDUs exists, the SDUs after the gap are passed to upper layer when the flush timer expires. Therefore, large values of the flush timer can delay data on RLC AM bearers when one or more gaps cannot be filled. As another example, if the flush timer expires while retransmissions are still occurring, meaning PDCP will operate in non-handover mode, a hyper fame number (HFN) can get out of synchronization with the ensuing difficulty deciphering data packets correctly and associated end user loss of information. It should be appreciated that loss of synchronization cannot be detected in general and, for voice calls, such lack of synchronization typically results in transmission of noise instead of retaining a voice session. The latter typically leads to dropped calls (e.g., voice or data), with the end user having to reinitiate a call.

As yet another example, once a PDCP PDU is submitted to RLC AM for transmission, the RLC protocol does not allow to control when the corresponding RLC SDU will be delivered at the receiver. Due to ARQ, it is possible that a PDCP SDU submitted while the flush timer still had a substantial time span to elapse would be delivered to the receiver after expiry. As a further example, in view that there is no RLC move receiver window mechanism, the eNode B cannot do anything else but re-establish RLC if that is about to occur in order to avoid getting the receiver out of HFN synchronization. Accordingly, it is substantially relevant for robust communication that a target eNode B has a reliable estimate of when the flush timer is to expire (e.g., in the UE).

In conventional packet-based telecommunication systems, PDCP is informed of a handover when a handover command is received, and that in turn starts the PDCP flush timer. Then a UE that is handed over must acquire the target cell and proceed with RACH procedure in order to successfully complete the handover. Subsequently, a target eNode B has an unknown amount of time, upper bounded by the flush timer, to complete the retransmission of PDCP SDUs. In order to cope with such uncertainty the flush timer is likely to be configured to large values (e.g., 1 second), which typically increase latency at handover and can delay user traffic is as much as the set value for the flush timer.

Conventionally, with respect to RRC connection re-establishment, PDCP is not informed that a connection re-establishment is occurring. From the user-plane perspective, to ensure that the PDCP features such as lossless data transfer, re-ordering and duplicate elimination are available during re-establishment, PDCP is to be instructed to operate in "handover mode." Moreover, conventional operation provides only one PDCP behavior applicable to both handover and connection re-establishment. Therefore, an indication from RRC to PDCP that handover occurs just before MAC/RLC re-set due to connection re-establishment is needed. It should be appreciated that, in an aspect, RRC connection re-establishment can be substantially similar to that of handover from the perspective of PDCP.

Similarly to the handover scenario, during RRC connection re-establishment, RLC passes RLC SDUs possibly with gaps to PDCP which operates in "handover mode" to provide lossless data transfer, re-ordering and duplicate elimination for a duration defined by the flush timer. Accordingly, within the subject innovation in the case of RRC connection re-establishment, the flush timer is started when DRBs resume from the (not specified) suspended state, as it occurs after RRC connection reconfiguration completes; e.g., when reconfiguration is successful. That allows a target eNode B to have a good estimate of when the flush timer will expire in the UE that is re-establishing connection and dimension such timer appropriately. Additionally, because the indication to PDCP that a handover occurs is still needed before RLC is re-set (due to re-establishment), the subject innovation can decouple the indication of handover from the start of the flush timer. It is to be noted that such indication of handover is associated with RRC communication re-establishment (e.g., forward handover).

It should be appreciated that the subject innovation can mitigate telecommunication performance issues associated with the existence of a single flush timer that is employed for both handover and RRC connection re-establishment. In handover, in view of aspects of the attachment procedure, target eNode B knows when UE will attach to the cell and thus access can be made reliable. Conversely, RRC connection re-establishment is substantially more uncertain as to when it can occur between initiation of re-establishment and completion of reconfiguration. Therefore, to be prepared for a worst case scenario, when a flush timer is triggered at the same time a handover indication is conveyed, the flush timer is typically conservative enough to avoid de-synchronization, which can result in a flush timer value that is pessimistic for the handover operation. In an aspect of the subject innovation, flush timer is substantially determined by a time interval a target eNode B needs to be able to perform retransmission; thus, in such scenario, the target eNode B is substantially unaffected by uncertainty of how long it takes a UE to access service through the target eNode B.

Within the subject innovation, flush timer triggering depends at least in part on successful handover and successful reconfiguration upon RRC connection re-establishment. When such events fail to succeed, the subject innovation contemplates various scenarios.

Unsuccessful Handover (HO).

(i) HO can fail; (ii) RRC can fail to start the PDCP flush timer; (iii) HO timer can eventually expires; (iv) Connection re-establishment can be initiated, which again sets PDCP in HO mode; (v) When RRC re-configuration is received, RRC will start the PDCP flush timer: PDCP is taken out of HO mode when flush timer expires; or (vi) if RRC connection re-establishment fails, system goes to RRC_IDLE: Upon going to idle, PDCP is taken out of HO mode.

Additionally, it should be appreciated that the flush timer may not be started in PDCP each time a RRC reconfiguration occurs. The flush timer can be started by PDCP if PDCP is already in HO mode when it receives the indication to start the flush timer. Thus, in case of reconfiguration, PDCP is not in HO mode and does not start the flush timer.

With respect to consecutive handovers followed by handover failure, the subject innovation includes that while RRC may indicate several times for PDCP to enter HO mode, the flush timer can be started once: when DRBs resume. It is noted that in an aspect of the subject innovation, if a DRB can resume communication after either handover or RRC communication re-establishment and reconfiguration, the flush timer can be started at that instance.

Figure 4:
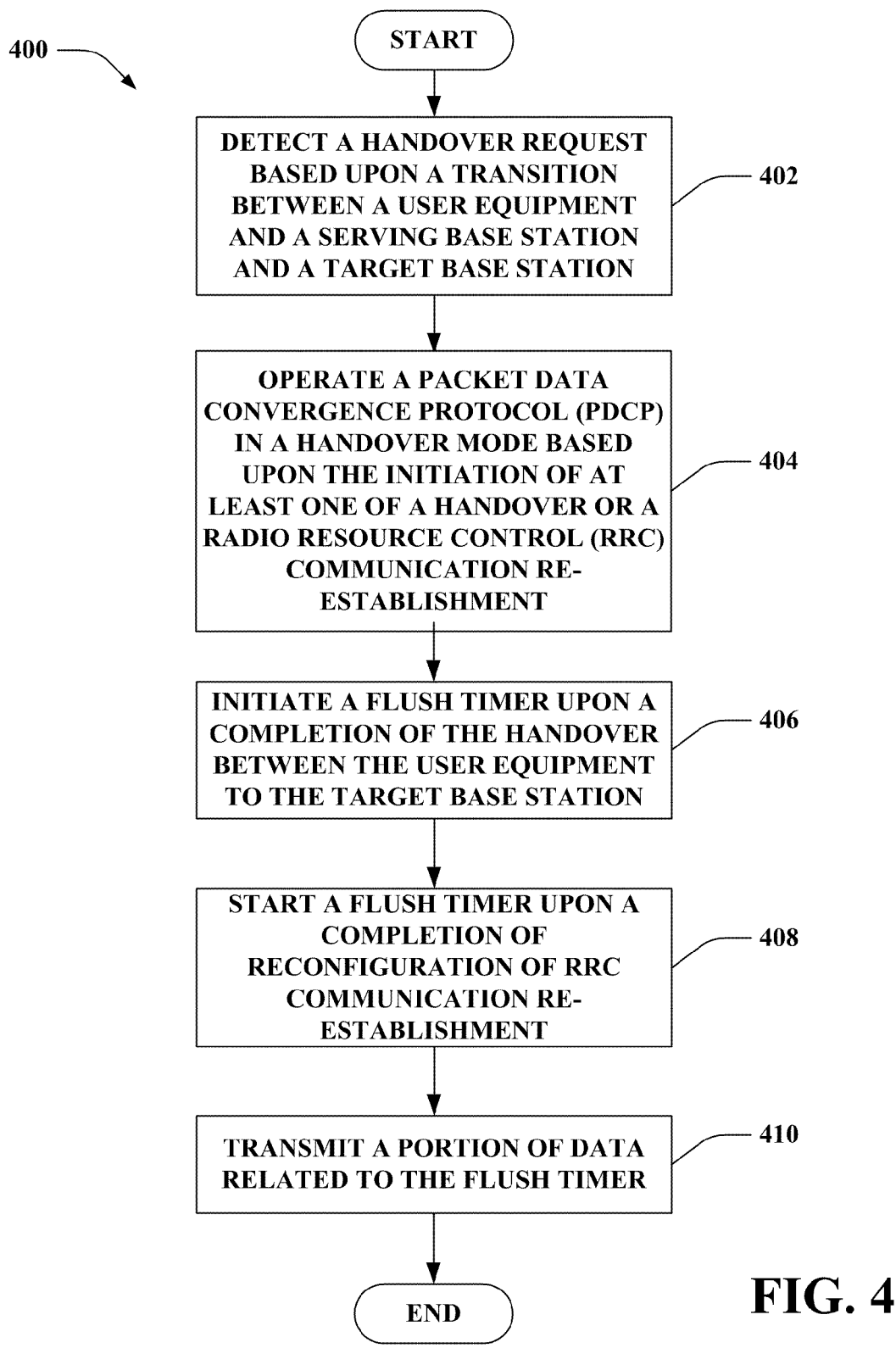
FIG. 4 is an illustration of an example methodology that can initiate a flush timer based upon handover completion and/or reconfiguration communication re-establishment completion.
Figure 5:
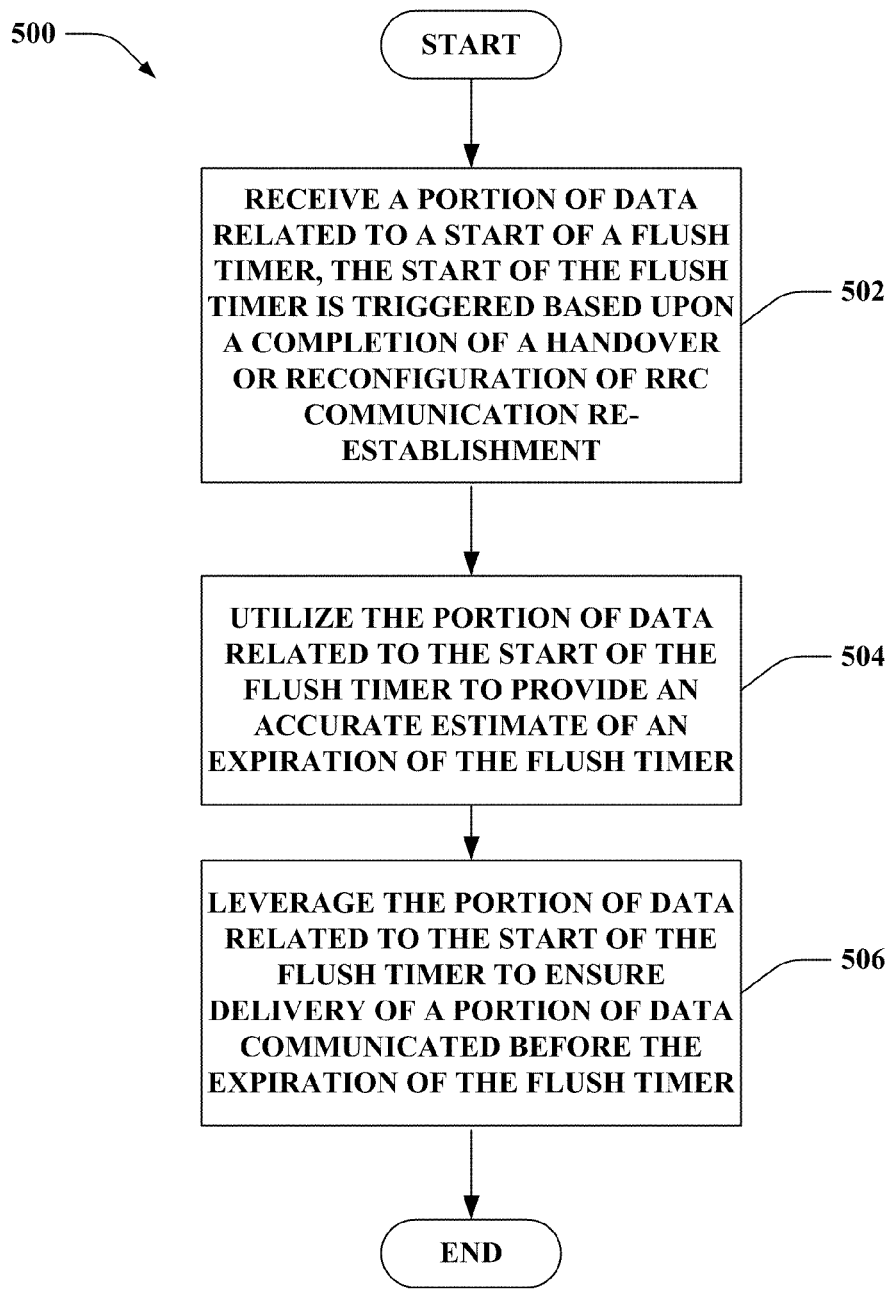
FIG. 5 is an illustration of an example methodology that can utilize a received configuration for a flush timer to ensure data delivery prior to the flush timer expiration.

Referring to FIGS. 4-5, methodologies relating to configuring a flush timer are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates initiating a flush timer based upon handover completion and/or re-configuration communication re-establishment completion. At reference numeral 402, a handover request can be detected based upon a transition between a user equipment and a serving base station and a target base station. At reference numeral 404, a packet data convergence protocol (PDCP) can operate in a handover mode based upon the initiation of at least one of a handover or a radio resource control (RRC) communication re-establishment. At reference numeral 406, a flush timer can be initiated upon a completion of the handover between the user equipment to the target base station. At reference numeral 408, a flush timer can be started upon a completion of reconfiguration of RRC communication re-establishment. At reference numeral 410, a portion of data related to the flush timer can be transmitted.

Now referring to FIG. 5, a methodology 500 that facilitates utilizing a received configuration for a flush timer to ensure data delivery prior to the flush timer expiration. At reference numeral 502, a portion of data related to a start of a flush timer can be received, wherein the start of the flush timer is triggered based upon a completion of a handover or reconfiguration of RRC communication re-establishment. At reference numeral 504, the portion of data related to the start of the flush timer can be utilized to provide an accurate estimate of an expiration of the flush timer. For example, the portion of data can be utilized to represent the flush timer in order to ascertain when the flush timer will expire. At reference numeral 506, the portion of data related to the start of the flush timer can be leveraged to ensure delivery of a portion of data communicated before the expiration of the flush timer. In other words, the estimate can be used as a representative flush timer in which data delivery may be completed prior to the expiration of the timer.

Figure 6:
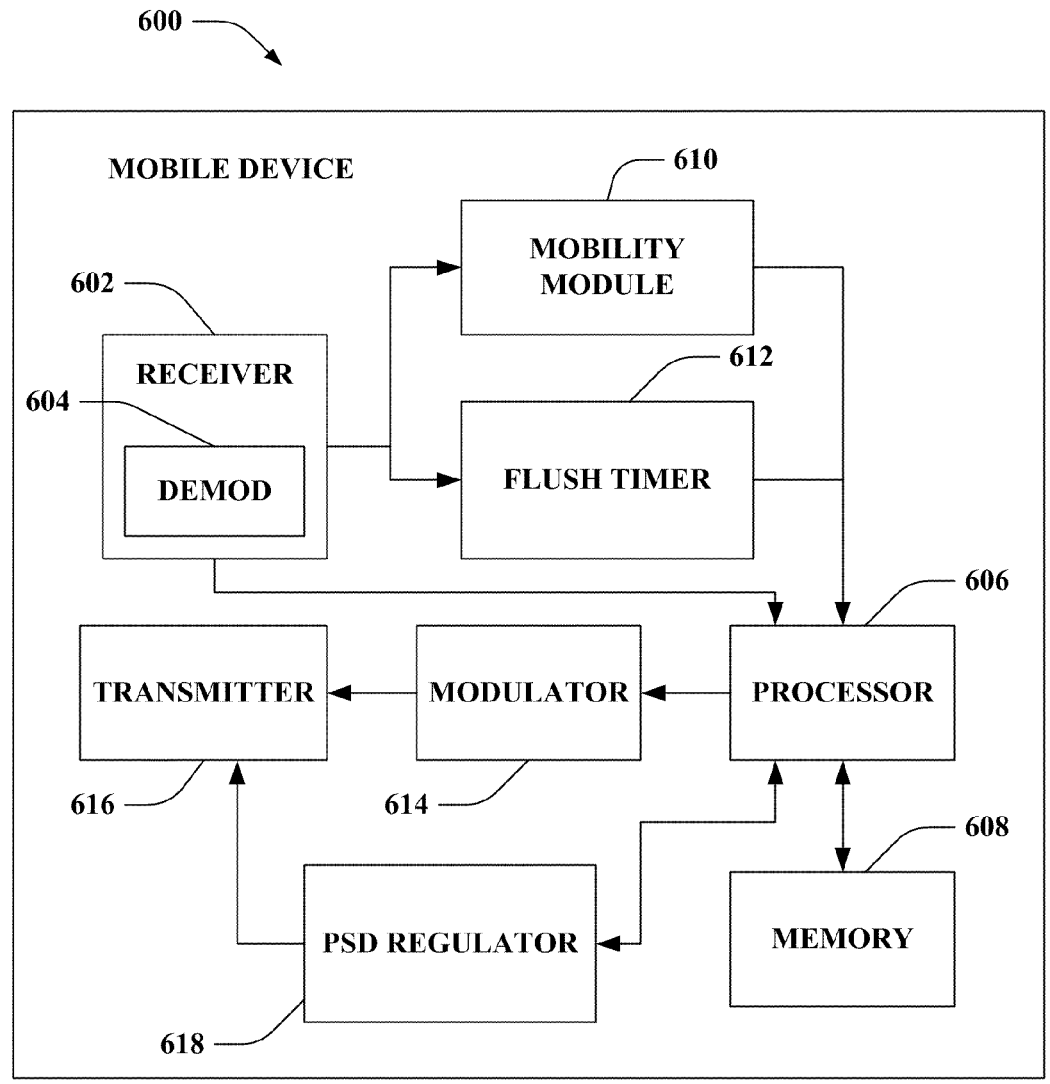
FIG. 6 is an illustration of an example mobile device that facilitates configuring a flush timer in a wireless communication system.

FIG. 6 is an illustration of a mobile device 600 that facilitates configuring a flush timer in a wireless communication system. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to at least one of a mobility module 610 or a flush timer 612. The mobility module 610 can implement a handover procedure between a serving base station and a target base station, wherein the mobility module 610 can detect a completion of the handover. Moreover, the mobility module 610 can initiate RRC connection re-establishment. For example, the mobility module 610 can detect a completion of reconfiguration after re-establishment. In general, based at least in part upon the mobility module 610 detection, the flush timer 612 can be started or triggered.

Mobile device 600 still further comprises a modulator 614 and transmitter 616 that respectively modulate and transmit signals to, for instance, a base station, another mobile device, etc. Although depicted as being separate from the processor 606, it is to be appreciated that the mobility module 610, flush timer 612, demodulator 604, and/or modulator 614 can be part of the processor 606 or multiple processors (not shown).

Figure 7:
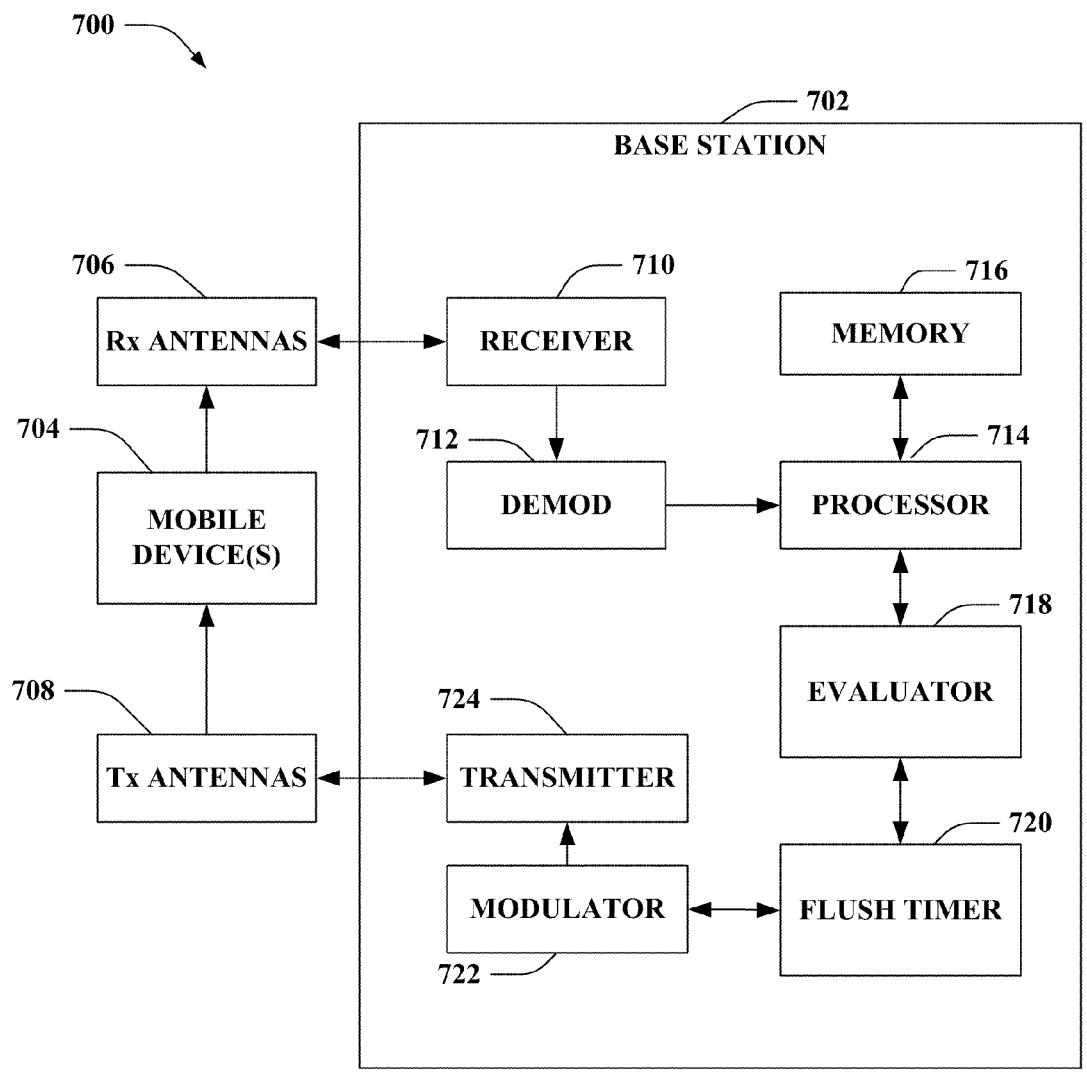
FIG. 7 is an illustration of an example system that facilitates initiating a flush timer in a wireless communication environment.

FIG. 7 is an illustration of a system 700 that facilitates initiating a flush timer in a wireless communication environment as described supra. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Moreover, the processor 714 can be coupled to at least one of an evaluator 718 or a flush timer 720. The evaluator 718 can analyze a portion of data related to the flush timer 720, wherein such analysis can indicate a start of the flush timer 720, an expiration of the flush timer 720, a duration of the flush timer 720, and/or any other suitable characteristic of the flush timer 720 associated with handover or RRC connection re-establishment. Furthermore, although depicted as being separate from the processor 714, it is to be appreciated that the evaluator 718, flush timer 720, demodulator 712, and/or modulator 722 can be part of the processor 714 or multiple processors (not shown).

Figure 8:
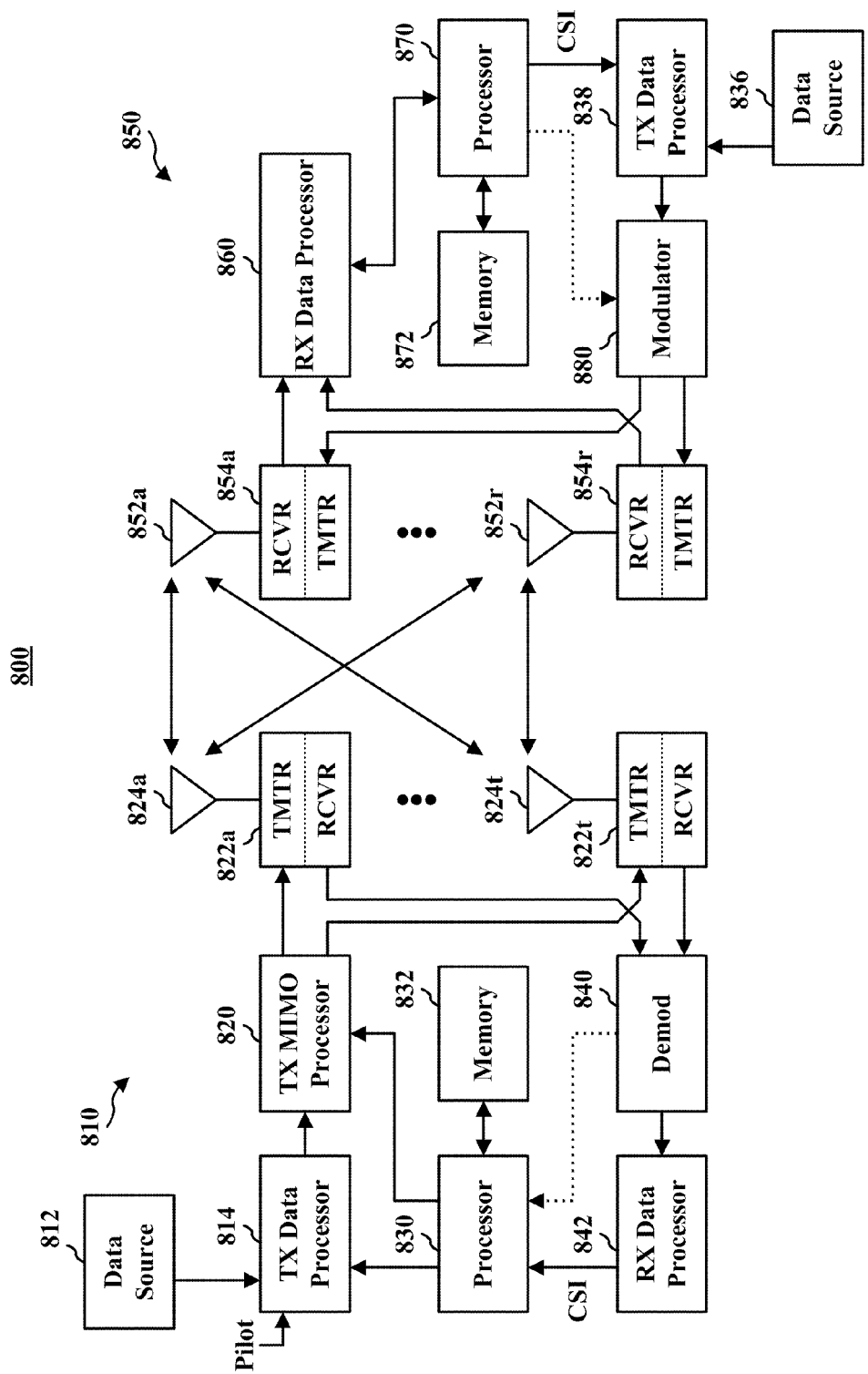
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
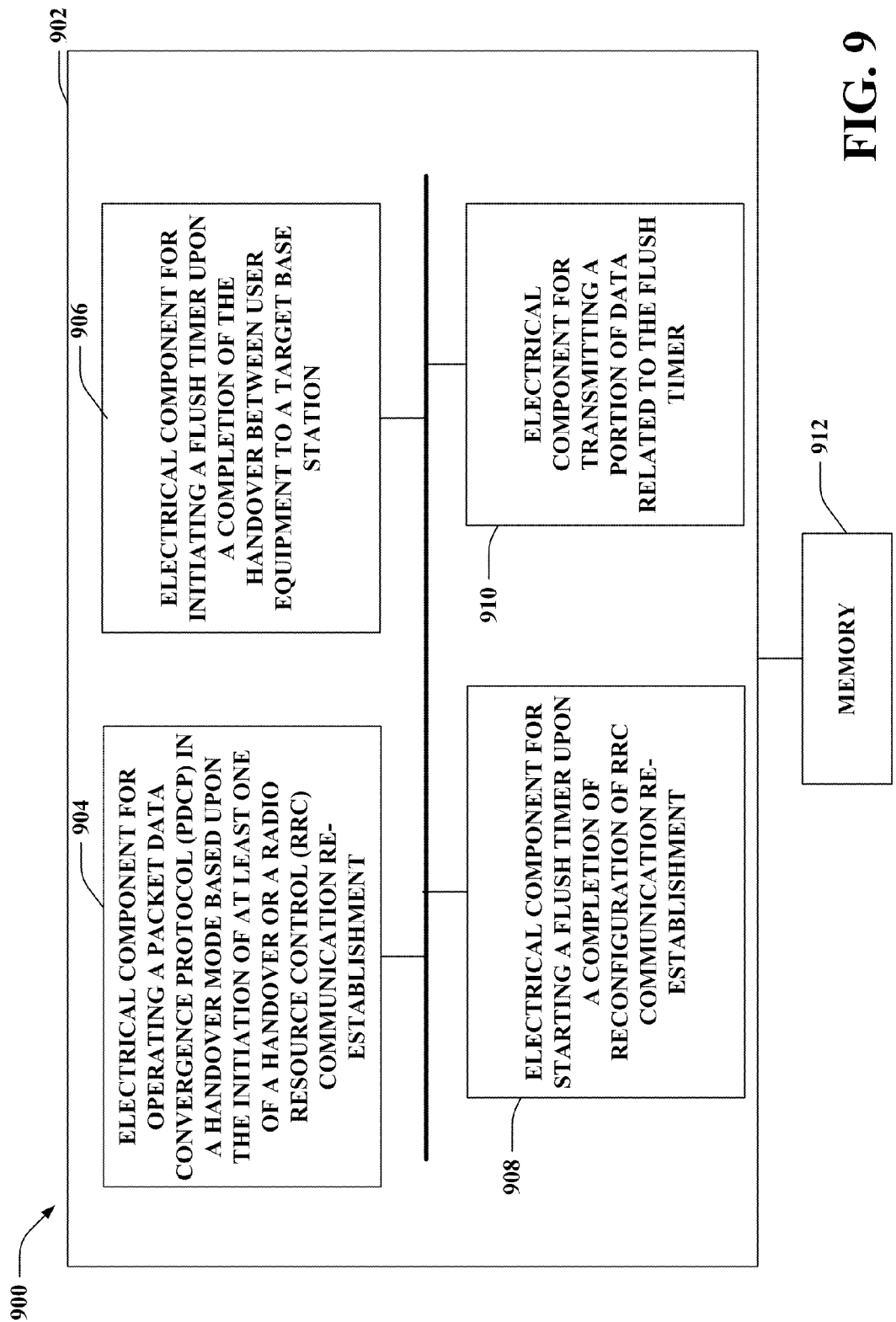
FIG. 9 is an illustration of an example system that facilitates initiating a flush timer based upon handover completion and/or reconfiguration communication re-establishment completion.

With reference to FIG. 9, illustrated is a system 900 that facilitates efficiently triggering a flush timer within a wireless environment. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. The logical grouping 902 can include an electrical component for operating a data packet convergence protocol (PDCP) in a handover mode based upon the initiation of at least one of a handover or a radio resource control (RRC) communication re-establishment 904. In addition, the logical grouping 902 can comprise an electrical component for initiating a flush timer upon a completion of the handover between user equipment to a target base station 906. Moreover, the logical grouping 902 can include an electrical component for starting a flush timer upon a completion of reconfiguration of RRC communication re-establishment 908. Furthermore, the logical grouping 902 can include an electrical component for transmitting a portion of data related to the flush timer 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 914.

Figure 10:
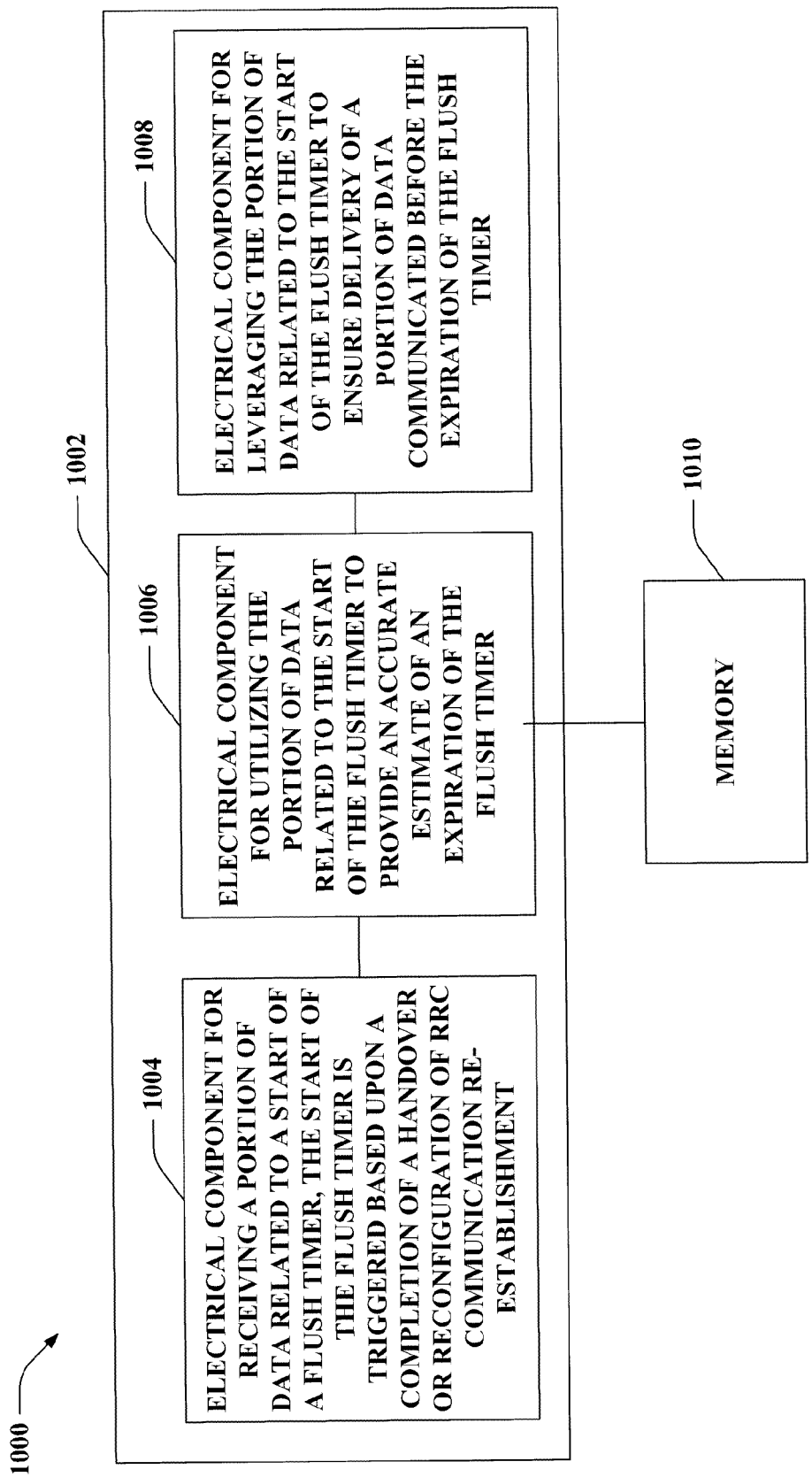
FIG. 10 is an illustration of an example system that can utilize a received configuration for a flush timer to ensure data delivery prior to the flush timer expiration.

Turning to FIG. 10, illustrated is a system 1000 that can configure a flush timer within a wireless communication environment. System 1000 can reside within a base station, mobile device, etc., for instance. As depicted, system 1000 includes functional blocks that can represent functions implemented by a processor, software, or combination thereof (e.g., firmware). System 1000 includes a logical grouping 1002 of electrical components that facilitate optimizing cross layer communications. Logical grouping 1002 can include an electrical component for receiving a portion of data related to a start of a flush timer, wherein the start of the flush timer is triggered based upon a completion of a handover or reconfiguration of RRC communication re-establishment 1004. Moreover, logical grouping 1002 can include an electrical component for utilizing the portion of data related to the start of the flush timer to provide an accurate estimate of an expiration of the flush timer 1006. Further, logical grouping 1002 can comprise an electrical component for leveraging the portion of data related to the flush timer to ensure delivery of a portion of data communicated before the expiration of the flush timer 1008. Additionally, system 1000 can include a memory 1010 that retains instructions for executing functions associated with electrical components 1004, 1006, and 1008. While shown as being external to memory 1010, it is to be understood that electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates initiating a flush timer with an accurate representation of a handover technique or a reconfiguration after re-establishment within a wireless network, comprising:

detecting a handover request between a user equipment and a serving base station and a target base station based upon at least one of a reception of mobility control command or an initiation of re-establishment;

operating a packet data convergence protocol (PDCP) in a handover mode based upon the initiation of at least one of a handover or a radio resource control (RRC) communication re-establishment;

starting a flush timer upon a completion of the handover between the user equipment to the target base station or upon a completion of reconfiguration of RRC communication re-establishment;

transmitting a portion of data related to the flush timer; and reverting to a regular PDCP operation when the flush timer expires.

2. The method of claim 1, further comprising separating an indication of the handover to PDCP from the start of a PDCP flush timer during re-establishment.

3. The method of claim 1, further comprising starting the flush timer for the RRC reconfiguration if the PDCP is in the handover mode and the RRC connection reconfiguration completes successfully.

4. The method of claim 1, further comprising utilizing an indication from RRC to PDCP that handover occurs just before at least one of a medium access control (MAC) or a radio link control (RLC) is reset due to re-establishment.

5. The method of claim 1, further comprising separating an indication of the handover to PDCP from the start of a PDCP flush timer during handover.

6. The method of claim 1, further comprising verifying at least one of a successful handover or a successful reconfiguration, wherein the flush timer is started when handover is completed successfully.

7. The method of claim 1, further comprising separating a medium access control (MAC) action, a radio link control (RLC) action, and a PDCP action related to handover from at least one action related to reconfiguration.

8. The method of claim 1, further comprising:
indicating an occurrence of handover to PDCP; or
resetting medium access control (MAC) and re-establishing radio link control (RLC) for an established radio bearer (RB).

9. The method of claim 1, further comprising implementing at least one of the following if handover is unsuccessful:
failing handover;
failing to start the PDCP flush timer;
expiration of a handover timer;
initiating connection re-establishment while setting PDCP in a handover mode;
starting the PDCP flush timer when RRC reconfiguration is received while the PDCP is taken out of handover mode when the flush timer expires; or
failing RRC re-establishment and placing at least one of a user equipment or a base station on idle while taking PDCP out of handover mode.

10. The method of claim 1, wherein the portion of data is transmitted to at least one of a user equipment, a base station, a serving base station, a target base station, a network, a server, or an eNode B.

11. A wireless communications apparatus, comprising:
at least one processor configured to:
detect a handover request between a user equipment and a serving base station and a target base station based upon at least one of a reception of mobility control command or an initiation of re-establishment;
operate a packet data convergence protocol (PDCP) in a handover mode based upon the initiation of at least one of a handover or a radio resource control (RRC) communication re-establishment;
start a flush timer upon a completion of the handover between the user equipment to the target base station or upon a completion of reconfiguration of RRC communication re-establishment;
transmit a portion of data related to the flush timer;
reverting to a regular PDCP operation when the flush timer expires; and
a memory coupled to the at least one processor.

12. The wireless communications apparatus of claim 11, further comprising at least one processor configured to separate an indication of the handover to PDCP from the start of a PDCP flush timer during re-establishment.

13. The wireless communications apparatus of claim 11, further comprising at least one processor configured to start the flush timer for the RRC reconfiguration if the PDCP is in the handover mode and the RRC connection reconfiguration completes successfully.

14. The wireless communications apparatus of claim 11, further comprising at least one processor configured to utilize an indication from RRC to PDCP that handover occurs just before at least one of a medium access control (MAC) or a radio link control (RLC) is reset due to re-establishment.

15. The wireless communications apparatus of claim 11, further comprising at least one processor configured to separate an indication of the handover to PDCP from the start of a PDCP flush timer during handover.

16. The wireless communications apparatus of claim 11, further comprising at least one processor configured to verify at least one of a successful handover or a successful reconfiguration, wherein the flush timer is started when handover is completed successfully.

17. The wireless communications apparatus of claim 11, further comprising at least one processor configured to separate a medium access control (MAC) action, a radio link control (RLC) action, and a PDCP action related to handover from at least one action related to reconfiguration.

18. The wireless communications apparatus of claim 11, further comprising at least one processor configured to at least one of: indicate an occurrence of handover to PDCP; or reset medium access control (MAC) and re-establish radio link control (RLC) for an established radio bearer (RB).

19. The wireless communications apparatus of claim 11, further comprising:
at least one processor configured to fail handover if handover is unsuccessful;
at least one processor configured to fail to start the PDCP flush timer if handover is unsuccessful;
at least one processor configured to expire of a handover timer if handover is unsuccessful;
at least one processor configured to initiate connection re-establishment while setting PDCP in a handover mode if handover is unsuccessful;
at least one processor configured to start the PDCP flush timer when RRC reconfiguration is received while the PDCP is taken out of handover mode when the flush timer expires if handover is unsuccessful; or
at least one processor configured to fail RRC re-establishment and placing at least one of a user equipment or a base station on idle while taking PDCP out of handover mode if handover is unsuccessful.

20. The wireless communications apparatus of claim 11, further comprising at least one processor configured to transmit the portion of data to at least one of a user equipment, a base station, a serving base station, a target base station, a network, a server, or an eNode B.

21. A wireless communications apparatus that enables configuring a flush timer in relation to a handover initiation or a radio resource control (RRC) communication re-establishment, comprising:
means for detecting a handover request between a user equipment and a serving base station and a target base station based upon at least one of a reception of mobility control command or an initiation of re-establishment;
means for operating a packet data convergence protocol (PDCP) in a handover mode based upon the initiation of at least one of a handover or a radio resource control (RRC) communication re-establishment or upon a completion of the handover between the user equipment to the target base station;
means for starting a flush timer upon a completion of reconfiguration of RRC communication re-establishment;
means for transmitting a portion of data related to the flush timer; and
means for reverting to a regular PDCP operation when the flush timer expires.

22. The wireless communications apparatus of claim 21, further comprising means for separating an indication of the handover to PDCP from the start of a PDCP flush timer during re-establishment.

23. The wireless communications apparatus of claim 21, further comprising means for starting the flush timer for the RRC reconfiguration if the PDCP is in the handover mode and the RRC connection reconfiguration completes successfully.

24. The wireless communications apparatus of claim 21, further comprising means for utilizing an indication from RRC to PDCP that handover occurs just before at least one of a medium access control (MAC) or a radio link control (RLC) is reset due to re-establishment.

25. The wireless communications apparatus of claim 21, further comprising means for separating an indication of the handover to PDCP from the start of a PDCP flush timer during handover.

26. The wireless communications apparatus of claim 21, further comprising means for verifying at least one of a successful handover or a successful reconfiguration, wherein the flush timer is started when handover is completed successfully.

27. The wireless communications apparatus of claim 21, further comprising means for separating a medium access control (MAC) action, a radio link control (RLC) action, and a PDCP action related to handover from at least one action related to reconfiguration.

28. The wireless communications apparatus of claim 21, further comprising:
means for indicating an occurrence of handover to PDCP; or
means for resetting medium access control (MAC) and re-establishing radio link control (RLC) for an established radio bearer (RB).

29. The wireless communications apparatus of claim 21, further comprising means for implementing at least one of the following if handover is unsuccessful:
means for failing handover;
means for failing to start the PDCP flush timer;
means for expiration of a handover timer;
means for initiating connection re-establishment while setting PDCP in a handover mode;
means for starting the PDCP flush timer when RRC reconfiguration is received while the PDCP is taken out of handover mode when the flush timer expires; or means for failing RRC re-establishment and placing at least one of a user equipment or a base station on idle while taking PDCP out of handover mode.

30. The wireless communications apparatus of claim 21, further comprising means for transmitting the portion of data to at least one of a user equipment, a base station, a serving base station, a target base station, a network, a server, or an eNode B.

31. A computer program product, comprising:
a non-transitory computer-readable medium comprising:
code for causing at least one computer to detect a handover request between a user equipment and a serving base station and a target base station based upon at least one of a reception of mobility control command or an initiation of re-establishment;
code for causing the at least one computer to operate a packet data convergence protocol (PDCP) in a handover mode based upon the initiation of at least one of a handover or a radio resource control (RRC) communication re-establishment;
code for causing the at least one computer to start a flush timer upon a completion of the handover between the user equipment to the target base station or upon a completion of reconfiguration of RRC communication re-establishment;
code for causing the at least one computer to transmit a portion of data related to the flush timer and
code for causing the at least one computer to revert to a regular PDCP operation when the flush timer expires.

32. The computer program product of claim 31, wherein the computer readable medium further comprising code for causing the at least one computer to separate an indication of the handover to PDCP from the start of a PDCP flush timer during re-establishment.

33. The computer program product of claim 31, wherein the computer readable medium further comprising code for causing the at least one computer to start the flush timer for the RRC reconfiguration if the PDCP is in the handover mode and the RRC connection reconfiguration completes successfully.

34. The computer program product of claim 31, wherein the computer readable medium further comprising code for causing the at least one computer to utilize an indication from RRC to PDCP that handover occurs just before at least one of a medium access control (MAC) or a radio link control (RLC) is reset due to re-establishment.

35. The computer program product of claim 31, wherein the computer readable medium further comprising code for causing the at least one computer to separate an indication of the handover to PDCP from the start of a PDCP flush timer during handover.

36. The computer program product of claim 31, wherein the computer readable medium further comprising code for causing the at least one computer to verify at least one of a successful handover or a successful reconfiguration, wherein the flush timer is started when handover is completed successfully.

37. The computer program product of claim 31, wherein the computer readable medium further comprising code for causing the at least one computer to separate a medium access control (MAC) action, a radio link control (RLC) action, and a PDCP action related to handover from at least one action related to reconfiguration.

38. The computer program product of claim 31, wherein the computer readable medium further comprising:
code for causing the at least one computer to indicate an occurrence of handover to PDCP; or
code for causing the at least one computer to reset medium access control (MAC) and re-establish radio link control (RLC) for an established radio bearer (RB).

39. The computer program product of claim 31, wherein the computer readable medium further comprising code for causing the at least one computer to implement the following if handover is unsuccessful:
fail handover;
fail to start the PDCP flush timer;
expire a handover timer;
initiate connection re-establishment while setting PDCP in a handover mode;
start the PDCP flush timer when RRC reconfiguration is received while the PDCP is taken out of handover mode when the flush timer expires; or
fail RRC re-establishment and placing at least one of a user equipment or a base station on idle while taking PDCP out of handover mode.

40. The computer program product of claim 31, wherein the computer readable medium further comprising code for causing the at least one computer to transmit the portion of data related to the flush timer to at least one of a user equipment, a base station, a serving base station, a target base station, a network, a server, or an eNode B.

41. A method that facilitates employing an optimized flush timer to ensure delivery of data within a wireless environment, comprising:
receiving a portion of data related to a start of a flush timer, wherein the start of the flush timer is triggered based upon at least one of the following:
a completion of a handover between the user equipment to the target base station; or
a completion of reconfiguration of RRC communication re-establishment;
utilizing the portion of data related to the start of the flush timer to provide an accurate estimate of an expiration of the flush timer; and
leveraging the portion of data related to the start of the flush timer to ensure delivery of a portion of data communicated before the expiration of the flush timer.

42. The method of claim 41, further comprising providing lossless data transfer, re-ordering, and duplicate elimination for a duration defined by the flush timer.

43. The method of claim 41, further comprising utilizing the portion of data related to the flush timer to identify at least one of the start of the flush timer, a duration of the flush timer, or an expiration of the flush timer.

44. The method of claim 41, further comprising passing a service data unit (SDU) to an upper layer upon the expiration of the flush timer if a gap in a sequence of received PDCP SDU exists during handover.

45. The method of claim 41, further comprising terminating a retransmission based upon the expiration of the flush timer to prevent hyper frame number (HFN) de-synchronization during handover.

46. The method of claim 41, further comprising passing a service data unit (SDU) to an upper layer upon the expiration of the flush timer if a gap in a sequence of received PDCP SDU exists during re-establishment.

47. The method of claim 41, further comprising terminating a retransmission based upon the expiration of the flush timer to prevent hyper frame number (HFN) de-synchronization during re-establishment.

48. The method of claim 41, further comprising hosting the flush timer within at least one of a user equipment, a base station, a serving base station, a target base station, a network, a server, or an eNode B.

49. The system of claim 41, further comprising receiving the portion of data with at least one of a user equipment, a base station, a serving base station, a target base station, a network, a server, or an eNode B.

50. The system of claim 41, further comprising determining a duration of time for the flush timer based upon a time interval a target base station needs to be able to perform at least one of the handover or the re-transmission.

51. A wireless communications apparatus, comprising:
at least one processor configured to:
receive a portion of data related to a start of a flush timer, wherein the start of the flush timer is triggered based upon at least one of the following:
a completion of a handover between the user equipment to the target base station; or
a completion of reconfiguration of RRC communication re-establishment;
utilize the portion of data related to the start of the flush timer to provide an accurate estimate of an expiration of the flush timer;
leverage the portion of data related to the start of the flush timer to ensure delivery of a portion of data communicated before the expiration of the flush timer; and
a memory coupled to the at least one processor.

52. The wireless communications apparatus of claim 51, further comprising at least one processor configured to provide lossless data transfer, re-ordering, and duplicate elimination for a duration defined by the flush timer.

53. The wireless communications apparatus of claim 51, further comprising at least one processor configured to utilize the portion of data related to the flush timer to identify at least one of the start of the flush timer, a duration of the flush timer, or an expiration of the flush timer.

54. The wireless communications apparatus of claim 51, further comprising at least one processor configured to pass a service data unit (SDU) to an upper layer upon the expiration of the flush timer if a gap in a sequence of received PDCP SDU exists during handover.

55. The wireless communications apparatus of claim 51, further comprising at least one processor configured to terminate a retransmission based upon the expiration of the flush timer to prevent hyper frame number (HFN) de-synchronization during handover.

56. The wireless communications apparatus of claim 51, further comprising at least one processor configured to pass a service data unit (SDU) to an upper layer upon the expiration of the flush timer if a gap in a sequence of received PDCP SDU exists during re-establishment.

57. The wireless communications apparatus of claim 51, further comprising at least one processor configured to terminate a retransmission based upon the expiration of the flush timer to prevent hyper frame number (HFN) de-synchronization during re-establishment.

58. The wireless communications apparatus of claim 51, further comprising at least one processor configured to host the flush timer within at least one of a user equipment, a base station, a serving base station, a target base station, a network, a server, or an eNode B.

59. The wireless communications apparatus of claim 51, further comprising at least one processor configured to receive the portion of data with at least one of a user equipment, a base station, a serving base station, a target base station, a network, a server, or an eNode B.

60. The wireless communications apparatus of claim 51, further comprising at least one processor configured to determine a duration of time for the flush timer based upon a time interval a target base station needs to be able to perform at least one of the handover or the re-transmission.

61. A wireless communications apparatus that enables cross layer optimization of data, comprising:
means for receiving a portion of data related to a start of a flush timer, wherein the start of the flush timer is triggered based upon at least one of the following:
a completion of a handover between the user equipment to the target base station; or
a completion of reconfiguration of RRC communication re-establishment;
means for utilizing the portion of data related to the start of the flush timer to provide an accurate estimate of an expiration of the flush timer; and
means for leveraging the portion of data related to the start of the flush timer to ensure delivery of a portion of data communicated before the expiration of the flush timer.

62. The wireless communications apparatus of claim 61, further comprising means for providing lossless data transfer, re-ordering, and duplicate elimination for a duration defined by the flush timer.

63. The wireless communications apparatus of claim 61, further comprising means for utilizing the portion of data related to the flush timer to identify at least one of the start of the flush timer, a duration of the flush timer, or an expiration of the flush timer.

64. The wireless communications apparatus of claim 61, further comprising means for passing a service data unit (SDU) to an upper layer upon the expiration of the flush timer if a gap in a sequence of received PDCP SDU exists during handover.

65. The wireless communications apparatus of claim 61, further comprising means for terminating a retransmission based upon the expiration of the flush timer to prevent hyper frame number (HFN) de-synchronization during handover.

66. The wireless communications apparatus of claim 61, further comprising means for passing a service data unit (SDU) to an upper layer upon the expiration of the flush timer if a gap in a sequence of received PDCP SDU exists during re-establishment.

67. The wireless communications apparatus of claim 61, further comprising means for terminating a retransmission based upon the expiration of the flush timer to prevent hyper frame number (HFN) de-synchronization during re-establishment.

68. The wireless communications apparatus of claim 61, further comprising means for hosting the flush timer within at least one of a user equipment, a base station, a serving base station, a target base station, a network, a server, or an eNode B.

69. The wireless communications apparatus of claim 61, further comprising means for receiving the portion of data with at least one of a user equipment, a base station, a serving base station, a target base station, a network, a server, or an eNode B.

70. The wireless communications apparatus of claim 61, further comprising means for determining a duration of time for the flush timer based upon a time interval a target base station needs to be able to perform at least one of the handover or the re-transmission.

71. A computer program product, comprising:
a non-transitory computer-readable medium comprising:
code for causing at least one computer to receive a portion of data related to a start of a flush timer, wherein the start of the flush timer is triggered based upon at least one of the following:

a completion of a handover between the user equipment to the target base station; or a completion of reconfiguration of RRC communication re-establishment;

code for causing the at least one computer to utilize the portion of data related to the start of the flush timer to provide an accurate estimate of an expiration of the flush timer; and code for causing the at least one computer to leverage the portion of data related to the start of the flush timer to ensure delivery of a portion of data communicated before the expiration of the flush timer.

72. The computer program product of claim 71, wherein the computer readable medium further comprising code for causing the at least one computer to provide lossless data transfer, re-ordering, and duplicate elimination for a duration defined by the flush timer.

73. The computer program product of claim 71, wherein the computer readable medium further comprising code for causing the at least one computer to utilize the portion of data related to the flush timer to identify at least one of the start of the flush timer, a duration of the flush timer, or an expiration of the flush timer.

74. The computer program product of claim 71, wherein the computer readable medium further comprising code for causing the at least one computer to pass a service data unit (SDU) to an upper layer upon the expiration of the flush timer if a gap in a sequence of received PDCP SDU exists during handover.

75. The computer program product of claim 71, wherein the computer readable medium further comprising code for causing the at least one computer to terminating a retransmission based upon the expiration of the flush timer to prevent hyper frame number (HFN) de-synchronization during handover.

76. The computer program product of claim 71, wherein the computer readable medium further comprising code for causing the at least one computer to pass a service data unit (SDU) to an upper layer upon the expiration of the flush timer if a gap in a sequence of received PDCP SDU exists during re-establishment.

77. The computer program product of claim 71, wherein the computer readable medium further comprising code for causing the at least one computer to terminate a retransmission based upon the expiration of the flush timer to prevent hyper frame number (HFN) de-synchronization during re-establishment.

78. The computer program product of claim 71, wherein the computer readable medium further comprising code for causing the at least one computer to host the flush timer within at least one of a user equipment, a base station, a serving base station, a target base station, a network, a server, or an eNode B.

79. The computer program product of claim 71, wherein the computer readable medium further comprising code for causing the at least one computer to receive the portion of data with at least one of a user equipment, a base station, a serving base station, a target base station, a network, a server, or an eNode B.

80. The computer program product of claim 71, wherein the computer readable medium further comprising code for causing the at least one computer to determine a duration of time for the flush timer based upon a time interval a target base station needs to be able to perform at least one of the handover or the re-transmission.

\* \* \* \* \*